US010818028B2

(12) United States Patent
Chakraborty et al.

(10) Patent No.: US 10,818,028 B2
(45) Date of Patent: Oct. 27, 2020

(54) DETECTING OBJECTS IN CROWDS USING GEOMETRIC CONTEXT

(71) Applicant: Microsoft Technology Licensing, LLC, Redmond, WA (US)

(72) Inventors: Ishani Chakraborty, Seattle, WA (US); Gang Hua, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 16/222,954

(22) Filed: Dec. 17, 2018

(65) Prior Publication Data
US 2020/0193628 A1  Jun. 18, 2020

(51) Int. Cl.
*G06K 9/00* (2006.01)
*G06T 7/70* (2017.01)
*G06K 9/62* (2006.01)

(52) U.S. Cl.
CPC .......... *G06T 7/70* (2017.01); *G06K 9/00778* (2013.01); *G06K 9/6228* (2013.01); *G06K 9/6262* (2013.01); *G06K 9/6277* (2013.01); *G06T 2207/20081* (2013.01); *G06T 2207/20084* (2013.01); *G06T 2207/30232* (2013.01); *G06T 2207/30244* (2013.01)

(58) Field of Classification Search
None
See application file for complete search history.

(56) References Cited

U.S. PATENT DOCUMENTS

| 6,525,731 | B1 * | 2/2003 | Suits ...................... G06T 15/04 |
| | | | 345/421 |
| 9,098,926 | B2 * | 8/2015 | Quan ................. G06K 9/00704 |
| 10,417,781 | B1 * | 9/2019 | Konolige ............ G06F 16/5854 |

(Continued)

OTHER PUBLICATIONS

Durand et al ("Conservative Visibility Preprocessing using Extended Projections" SIGGRAPH '00, Proceeding of the 27th annual conference on computer graphics . . . Jul. 2000. (Year: 2000).*

(Continued)

*Primary Examiner* — Shervin K Nakhjavan
(74) *Attorney, Agent, or Firm* — Alleman Hall Creasman & Tuttle LLP

(57) ABSTRACT

A computing system is configured to train an object classifier. Monocular image data and ground-truth data are received for a scene. Geometric context is determined including a three-dimensional camera position relative to a fixed plane. Regions of interest (RoI) and a set of potential occluders are identified within the image data. For each potential occluder, an occlusion zone is projected onto the fixed plane in three-dimensions. A set of occluded RoIs on the fixed plane are generated for each occlusion zone. Each occluded RoI is projected back to the image data in two-dimensions. The classifier is trained by minimizing a loss function generated by inputting information regarding the RoIs and the occluded RoIs into the classifier, and by minimizing location errors of each RoI and each occluded RoI of the set on the fixed plane based on the ground-truth data. The trained classifier is then output for object detection.

20 Claims, 12 Drawing Sheets

(56) References Cited

U.S. PATENT DOCUMENTS

| | | | |
|---|---|---|---|
| 2010/0177163 A1* | 7/2010 | Yang | G06T 15/503 348/45 |
| 2012/0188342 A1* | 7/2012 | Gervautz | G06T 7/73 348/46 |
| 2014/0270363 A1* | 9/2014 | Chakraborty | G06K 9/00248 382/103 |
| 2014/0270482 A1* | 9/2014 | Chakraborty | G06K 9/00677 382/154 |
| 2015/0310624 A1* | 10/2015 | Bulan | G06T 7/215 382/103 |
| 2016/0180192 A1 | 6/2016 | Ayvaci et al. | |
| 2017/0124415 A1 | 5/2017 | Choi et al. | |
| 2018/0225852 A1* | 8/2018 | Um | G06K 9/4604 |
| 2019/0130219 A1* | 5/2019 | Shreve | G06K 9/6262 |
| 2019/0197765 A1* | 6/2019 | Molyneaux | G06T 15/08 |
| 2019/0340775 A1* | 11/2019 | Lee | G05D 1/0212 |
| 2019/0355138 A1* | 11/2019 | Hall | H04N 5/2256 |
| 2019/0384994 A1* | 12/2019 | Frossard | G06K 9/6273 |
| 2020/0081448 A1* | 3/2020 | Creusot | G06T 7/11 |
| 2020/0082206 A1* | 3/2020 | Jin | G06K 9/628 |

OTHER PUBLICATIONS

Schaufler et al ("Conservative Volumetric Visibility with Occluder Fusion", SIGGRAPH '00, Proceeding of the 27th annual conference on computer graphics . . . Jul. 2000. (Year: 2000).*

Baque, et al., "Deep Occlusion Reasoning for Multi-Camera Multi-Target Detection", In Journal of Computing Research Repository, Apr. 20, 2017, pp. 1-10.

Bylinskii, et al., "Where Should Saliency Models Look Next?", In Proceedings of 14th European Conference on Computer Vision, Oct. 8, 2016, pp. 1-16.

Chavdarova, et al., "Wildtrack: A A Multi-camera HD Dataset for Dense Unscripted Pedestrian Detection", In Proceedings of IEEE Conference on Computer Vision and Pattern Recognition, Jun. 18, 2018, pp. 5030-5039.

Chen, et al., "Spatial Memory for Context Reasoning in Object Detection", In Proceedings of the I IEEE International Conference on Computer Vision, Oct. 22, 2017, 11 Pages.

Dai, et al., "R-FCN: Object Detection via Region-based Fully Convolutional Networks", In Proceedings of Advances in Neural Information Processing Systems, Dec. 5, 2016, 11 Pages.

Dehaene, et al., "Core knowledge of geometry in an amazonian indigene group", In Journal of Science, vol. 311, Issue 5759, Jan. 20, 2006, pp. 381-384.

Garg, et al., "Unsupervised cnn for single view depth estimation: Geometry to the rescue", In Proceedings of the 14th European Conference on Computer Vision, Oct. 8, 2016, 16 Pages.

Gupta, et al., "Constraint integration for multiview pose estimation of humans with self-occlusions", In 3rd International Symposium on 3D Data Processing, Visualization and Transmission, Jun. 14, 2006, 8 Pages.

Hartley, et al., "Multiple View Geometry in Computer Vision", In Publication of Cambridge University Press, Mar. 2004, 673 Pages.

Hattori, et al., "Synthesizing a scene-specific pedestrian detector and pose estimator for static video surveillance", In International Journal of Computer Vision, vol. 126, Issue 9, Sep. 2018, 19 Pages.

Hedau, et al., "Recovering the spatial layout of cluttered rooms", In Proceedings of the IEEE 12th International Conference on Computer Vision, Sep. 29, 2009, 8 Pages.

Hochstein, et al., "View from the top: hierarchies and reverse hierarchies in the visual system", In Journal of Neuron, vol. 36, Issue 5, Dec. 5, 2002, pp. 791-804.

Hoiem, et al., "Putting objects in perspective", In International Journal of Computer Vision, vol. 80, Issue 1, Oct. 1, 2008, 8 Pages.

Hsiao, et al., "Occlusion reasoning for object detection under arbitrary viewpoint", In Proceedings of the IEEE Conference on Computer Vision and Pattern Recognition, Jun. 16, 2012, pp. 1-8.

Huang, et al., "Efficient inference in occlusion-aware generative models of images", In in Proceedings of International Conference on Learning Representations, May 2, 2016, pp. 1-10.

Kar, et al., "Amodal completion and size constancy in natural scenes", In Proceedings of IEEE International Conference on Computer Vision, Dec. 7, 2015, pp. 1-9.

Kendall, et al., "Geometric loss functions for camera pose regression with deep learning", In Proceedings of IEEE Conference on Computer Vision and Pattern Recognition, vol. 3, Jul. 1, 2017, pp. 1-10.

Kong, et al., "Recurrent scene parsing with perspective understanding in the loop", In Proceedings of IEEE Conference on Computer Vision and Pattern Recognition, Jun. 18, 2018, 16 Pages.

Lee, et al., "Estimating spatial layout of rooms using volumetric reasoning about objects and surfaces", In Proceedings of the 23rd International Conference on Neural Information Processing Systems, vol. 1, Dec. 6, 2010, 9 Pages.

Li, et al., "Amodal instance segmentation", In Proceedings of 14th European Conference on Computer Vision, Oct. 8, 2016, pp. 1-23.

Li, et al., "Foveanet: Perspective-aware urban scene parsing", In Proceedings of the IEEE International Conference on Computer Vision, Oct. 22, 2017, pp. 784-792.

Liu, et al., "Single shot multibox detector", In Proceedings of the 14th European Conference on Computer Vision, Oct. 8, 2016, 17 Pages.

Mahjourian, et al., "Unsupervised Learning of Depth and Ego-Motion From Monocular Video Using 3d Geometric Constraints", In Proceedings of IEEE Conference on Computer Vision and Pattern Recognition, Feb. 15, 2018, 9 Pages.

Milan, et al., "Mot16: A benchmark for multi object tracking", In Journal of Computing Research Repository, Mar. 2016, pp. 1-12.

Pan, et al., "Coherent object detection with 3d geometric context from a single image", In Proceedings of the IEEE International Conference on Computer Vision, Jan. 1, 2013, 8 Pages.

Redmon, et al., "Yolo9000: Better, faster, stronger", In Proceedings of the IEEE Conference on Computer Vision and Pattern Recognition, Jul. 21, 2017, 9 Pages.

Ren, et al., "Faster R-CNN: Towards Real-Time Object Detection with Region Proposal Networks", In Proceedings of Advances in Neural Information Processing Systems, Dec. 7, 2015, 14 Pages.

Rhodin, et al., "Learning monocular 3d human pose estimation from multi-view images", In Proceedings of IEEE Conference on Computer Vision and Pattern Recognition, Mar. 13, 2018, pp. 1-10.

Schwing, et al., "Box in the box: Joint 3d layout and object reasoning from single images", In Proceedings of the IEEE International Conference on Computer Vision, Jan. 1, 2013, 8 Pages.

Shrivastava, et al., "Training region-based object detectors with online hard example mining", In Proceedings of IEEE Conference on Computer Vision and Pattern Recognition, Jun. 27, 2016, pp. 1-9.

Stewart, et al., "End-to-end people detection in crowded scenes", In Proceedings of IEEE Conference on Computer Vision and Pattern Recognition, Jun. 27, 2016, pp. 1-9.

Sun, et al., "Object detection using geometrical context feedback", In International Journal of Computer Vision, vol. 100, Issue 2, Nov. 1, 2012, 16 Pages.

Tulsiani, et al., "Multi-view supervision for single-view reconstruction via differentiable ray consistency", In Proceedings of IEEE Conference on Computer Vision and Pattern Recognition, Jul. 21, 2017, pp. 1-13.

Yu, et al., "Back to Basics: Unsupervised learning of optical flow via brightness constancy and motion smoothness", In Proceedings of the ECCV Workshops—Computer Vision, Oct. 8, 2016, 4 Pages.

Zhang, et al., "Deepcontext: Context-Encoding Neural Pathways for 3d Holistic Scene Understanding", In Proceedings of the IEEE International Conference on Computer Vision, Oct. 22, 2017, 10 Pages.

Zhang, et al., "Is faster R-CNN doing well for pedestrian detection?", In Proceedings of 14th European Conference on Computer Vision, Oct. 8, 2016, pp. 1-15.

Zhou, et al., "Unsupervised learning of depth and ego-motion from video", In Proceedings of the IEEE Conference on Computer Vision and Pattern Recognition, vol. 2, Jul. 1, 2017, 10 Pages.

(56) References Cited

OTHER PUBLICATIONS

Zhu et al., "Semantic amodal segmentation", In Proceedings of IEEE Conference on Computer Vision and Pattern—Recognition, vol. 02, Jul. 1, 2017, pp. 1-11.

"International Search Report and Written Opinion Issued in PCT Application No. PCT/US19/065311", dated Mar. 20, 2020, 12 Pages.

Rogez, et al., "LCR-Net: Localization-Classification-Regression for Human Pose", In Proceedings of The IEEE Conference on Computer Vision and Pattern Recognition, Jul. 21, 2017, pp. 1216-1224.

\* cited by examiner

DETECTING OBJECTS IN CROWDS USING GEOMETRIC CONTEXT

BACKGROUND

Modern object detection systems often rely on region proposal methods and convolutional neural networks to generate candidate regions, and then classify those regions as comprising a desired object or not. Using these methods, objects such as people and vehicles may be identified and quantified based on image data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to classifying objects using geometric context. In one example, a computing system is configured to train an object classifier. Monocular image data and ground-truth data are received for a scene. Geometric context is determined including a three-dimensional camera position relative to a fixed plane. Regions of interest (RoI) and a set of potential occluders are identified within the image data. For each potential occluder, an occlusion zone is projected onto the fixed plane in three-dimensions. A set of occluded RoIs on the fixed plane are generated for each occlusion zone. Each occluded RoI is projected back to the image data in two-dimensions. The classifier is trained by minimizing a loss function generated by inputting information regarding the RoIs and the occluded RoIs into the classifier, and by minimizing location errors of each RoI and each occluded RoI of the set on the fixed plane based on the ground-truth data. The trained classifier is then output for object detection.

DETAILED DESCRIPTION

Early research in object recognition was founded on geometric principles innate to humans, such as occlusion, perspective, and groundedness, using formal geometric models as informative priors to modulate statistical learning. More recently, object detectors are often cast as regression on deep convolutional image features. Neural networks such as region-based fully convolutional networks (R-FCN) and region-based convolutional neural networks (e.g., Faster R-CNN) are trained on large datasets, making them robust to most perceptual variations. However, such neural networks may fail in crowded scenes featuring a large number of objects within the same category.

For example, such neural networks may perform reasonably well in detecting pedestrians in an image generated via wide angle surveillance or monitoring cameras when the pedestrians are well-space and not occluding one another. However, in crowded regions of an image, pedestrians may be missed completely or manifest as merged detections, with multiple pedestrians detected as a single blob. Thus, delineating these partially visible instances would help to increase the overall detection accuracy and improve downstream tasks, such as people tracking and activity recognition.

One reason for sub-optimal performance in crowded scenes is that the object detectors are trained on the statistics of appearance features alone. For example, person detection may favor an identified object to be a certain size, and possess certain characteristics, such as a head, torso, legs, etc. Many off-the-shelf models work well in idealized situations featuring isolated objects and a clean image background. However, in real-world applications, crowded scenes feature problems of object occlusion or partial occlusion, partial observations, lighting changes, background gradients and patterns, scale size, etc.

Figure 1:
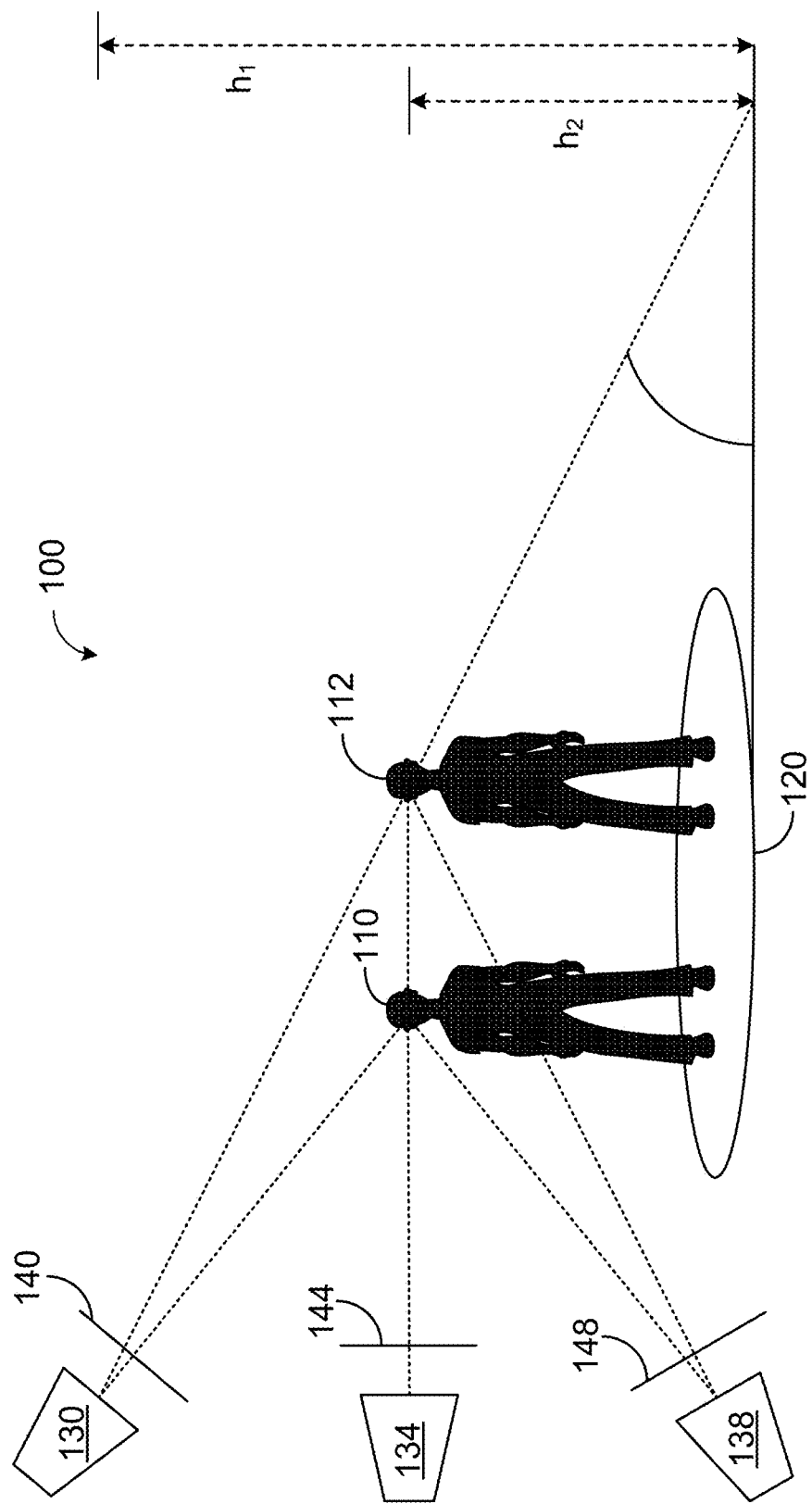
FIG. 1 shows an example scene in which object detection may be performed.

As an example, FIG. 1 shows an example scene 100. Individuals 110 and 112 are depicted as standing on ground plane 120. Surveillance cameras 130, 134, and 138 are shown imaging scene 100 from differing perspectives. Camera 130 is an overhead camera positioned at a height $h_1$ above ground plane 120. Camera 134 is an eye-level camera positioned at a height $h_2$ above ground plane 120, where $h_2 < h_1$. Camera 138 is a ground level camera positioned on ground plane 120.

Two problems for surveillance cameras are scale (e.g., proximity to camera) and occlusion. In this example, individual 110 is closer to cameras 130, 134, and 138 than is individual 112. If individual 112 is significantly further from the cameras, individual 112 may appear smaller in the scene image than individual 110. For expansive scenes, individuals at differing distances may have significantly different sizes in the scene image. As such, it may become difficult to filter out objects based on a simple size threshold.

When an object such as individual 110 is positioned between a camera and another object, such as individual 112, the distal individual may be occluded by the proximal individual. In this example, individual 112 may be partially occluded by individual 110 from the perspectives of cameras 130 and 138, and may be significantly occluded from camera 134. For example, camera 130 may view the head and torso, but not the legs and feet of individual 112.

The specific occlusion pattern of nearby objects in the image depends on the camera viewpoint with reference to the ground plane in 3D. Camera 130 is positioned at height $h_1$ and has an image plane 140 that is positioned at an acute angle to ground plane 120. Camera 134 is positioned at height $h_2$ and has an image plane 144 that is positioned perpendicular to ground plane 120. Camera 138 is positioned on the ground and has an image plane 148 that is positioned at an obtuse angle to ground plane 120. The camera pose and scene geometry inform the physics of the image view. Informative cues, such as line-of-sight ("los") angles, shown as dashed lines, differ for each camera pose.

Typically, object detectors constitute a multi-stage pipeline through which images are first parsed into salient regions and then refined into bounding boxes, all of which is confined to the 2D image (pixel) space. The assumption with such detectors is that independent and identically distributed (i.i.d.) sampling from a large set of training data would eventually cover substantially all possible variations in the viewspace, resulting in an occlusion resilient model. These convolutional features do not account for scene regularities such as an expected object size at a certain location, or that most objects are grounded.

Further, object detection methods that are based on appearance and image processing typically assume that the entire object is visible at all times. Such methods thus have poor recall and tend to undercount due to missed classifications and false negatives. For humans, partial occlusion is compensated by the process of amodal completion, e.g., filling in missing object information behind occluding surfaces based on known or assumed object geometry. Several works have attempted to incorporate geometric context to improve statistical object detectors. In one example of such a work, a graphical model places local object detection in the overall 3D scene by modeling the interdependence of object sizes, surface orientations and camera viewpoint. This model may further include additional pose constraints on object configurations within a feedback loop. In another example, a cubic room representation is deployed for indoor scenes, showing that layout estimation improves object detection. These models improve the overall detection accuracy, but are typically staged as sequential or iterative components that couple with an independent object detector to refine object hypotheses.

Currently, the most accurate object detectors are predominantly single stage or multi-stage convolutional neural networks (CNN) that behave as highly parallelized sliding window classifiers. However, utilizing context inclusion as structured prediction is challenging to implement without breaking the end-to-end formulation of the fixed CNN architecture. Some workarounds for this challenge include feeding object masks from current detection as contextual input during subsequent iterations. To induce scale context, a perspective heatmap may be generated and fused with inference from both a coarse and a fine subnetwork. However, these methods may be limited to adapting for scale under perspective distortions, and may involve multi-network or multi-iteration pipelines.

Older models could theoretically be trained on scale and occlusion data. However, this would require a very large number of combinatorial possibilities to account for the possible set of real-world occurrences. This would include large numbers of possible camera angles, fields-of-view, etc. as applied to differing ground plane positionings and sizes of the imaging area footprint. Thus, increasing accuracy in this manner would involve exponentially more training data and training time.

Thus, examples are disclosed that include a proposal-based deep neural network modulated by the geometric context of the scene. The disclosed examples combine image processing and appearance models with the physics and optics of the real world. Ambiguity is reduced by using monocular image cues to estimate the geometric context of the scene (e.g., camera pose & scene cues) and placing that information implicitly into the object detector itself. Such geometric context acts as a prior at two levels of learning through occluder-centric proposals to model inter-object occlusion during region proposal generation (RPN), and through using a geometric loss that models object position and scale consistency during per region loss computation, while maintaining the feedforward topology of the underlying object detector.

Geometric context may be induced in deep neural networks through reprojection loss that quantifies how closely a 3D point estimate matches its true projection in 2D image space. A fixed plane, such as a ground plane, may be established as a common frame of reference, allowing for the measuring of position consistency in 3D. This allows the search space to be narrowed by using the camera geometry. The camera pose and scene cues may thus be implicitly placed within, and used to prime, the object detector.

Viewpoint-agnostic region proposals may be augmented with sparse, occluder-centric proposals during region proposal generation, in order to focus on scene-specific hard regions, while learning to detect under a diverse set of occlusion patterns. This mimics the amodal completion that allows humans to innately perform occlusion reasoning by using scene geometry to focus the classifier on portions of the object that are visible. While previous methods treat amodal completion purely as a learning problem, the approaches herein demonstrate that amodal completion is essentially a geometric phenomenon that relies on the underlying scene cues.

Geometric loss is introduced for bounding box regression, where the scene layout is used as a projection space to impose relational and position consistency of proposals on the ground plane. By utilizing the underlying scene geometry to modulate this type of feature activation, discriminative features can be learned that improve the baseline object detector. To accomplish this, the geometric context of the scene (e.g., the camera pose with respect to the ground plane) is inserted into a Deep Neural Network (DNN) model of object detection, wherein variables are back propagated through all layers of the network. Experiments on state-of-the-art DNN detectors and detection benchmarks are presented herein and demonstrate that the disclosed examples have e the technical effect of outperforming strong baselines by an average of approximately 5%, and thus lowering an error rate of object detection and classification.

The disclosed examples utilize known methods of two-stage object detection, namely Faster RCNN and Region-based Fully Convolutional Network (R-FCN), to which geometric context is induced during feature activation and loss computation. By inducing geometric context into feature learning, occluded parts may be better modeled, and recall may be improved. The disclosed examples are described in the context of pedestrian detection, but may be applied to other types of object detection having a fixed reference plane. For example, vehicles, animals, and other objects that are anchored to a ground plane may be classified with such a model using similar detection parameters so long as approximate physical dimensions of the object in the real world are known. The fixed plane need not be a ground plane. For example, a cave ceiling may provide a fixed plane for bat detection, a boat hull may provide a fixed plane for barnacle detection, etc.

Figure 2:
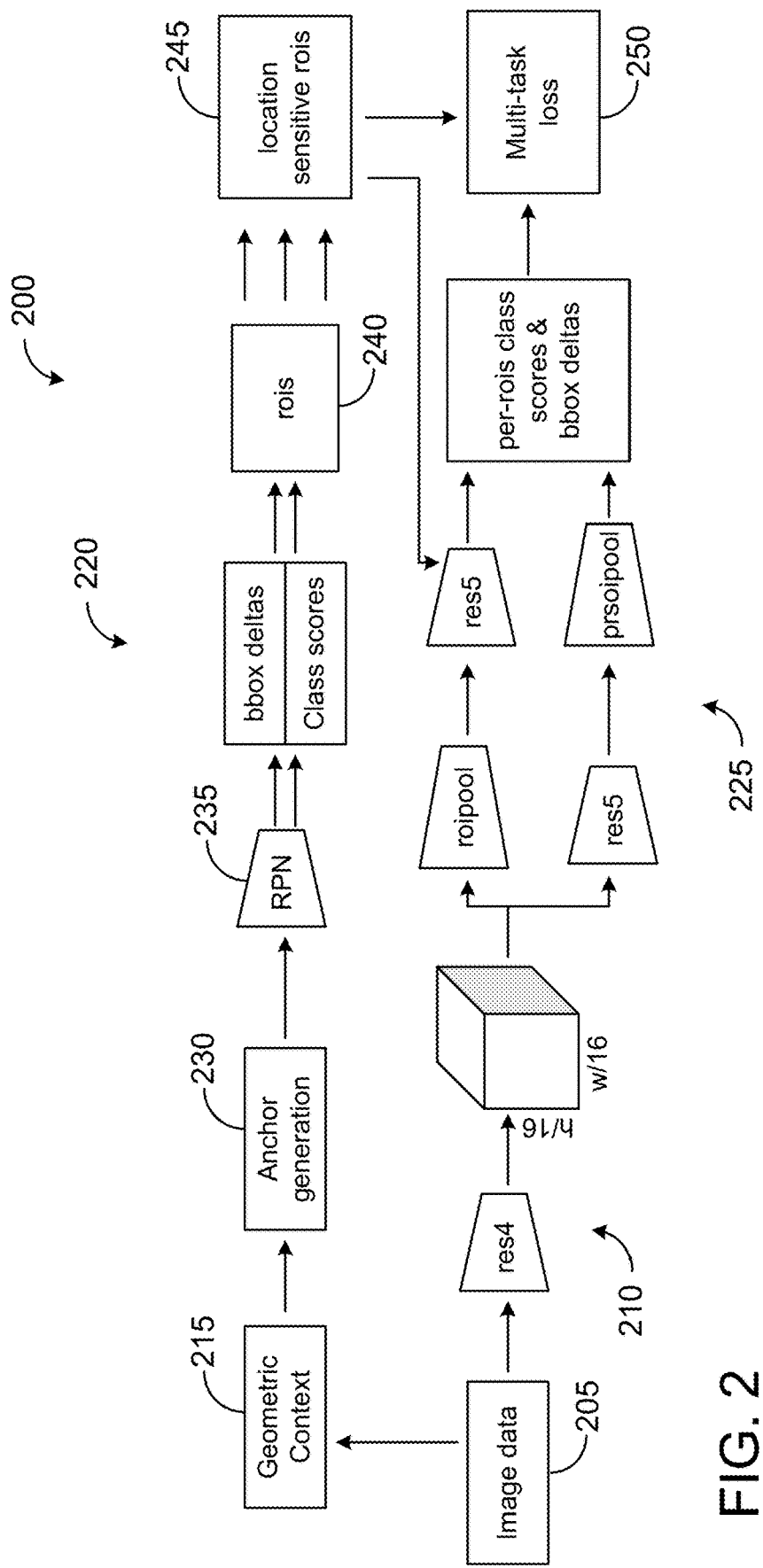
FIG. 2 schematically shows an example pipeline for object detection using a deep neural network.

FIG. 2 illustrates an example detection pipeline 200. In the pipeline 200, image data 205 may be fed into a DNN at 210. As an example, the DNN may include Resnet-101. The 4th (Res4) and 5th (Res5) resnet blocks are depicted, but image data 205 may be introduced at other layers and blocks of the network. Further, geometric context 215 may be received and/or generated from the image data. For example, camera pose may be included within ground-truth data or other data associated with the image data, and/or a one-time, approximate camera pose estimation determined from the image data may be performed as a pre-processing step. The determined geometric context can be applied to objects as part of a 3D model. For example, an object that appears to be a person, but is far away may be identified as a person if the object is on the ground plane, while an object suspended in the air would be ignored.

The geometric context is built onto the architecture of a two-stage object detector comprising two modules: region proposal network 220 (RPN), and classification stage 225. Bounding boxes are fitted around objects by the RPN 220, and then objects are classified at the classification stage 225.

Image data 205 and geometric context 215 may be used for anchor generation 230. During anchor generation, dense, pixel-based anchors are augmented with 2D projections of sparse, occluder-centric anchors in 3D. Next, the anchors are passed through region proposal network (RPN) stage 235, where they are filtered and labeled.

To integrate geometric context 215, RPN 235 may be modified to generate occluder-centric regions. Traditionally, RPN would normally look for specific gradients from training in image data (e.g., background/foreground). Two people standing together would be classified together or not at all, depending on the training. As described further herein, the foreground object is used to generate occlude-centric anchors, wherein neighboring regions are parsed for the presence of an object partially occluded by the foreground object. Occluder-centric anchors and location sensitive RoIs (245) may be referred to herein as early fusion, referring to the fusion of geometric context with the classification pipeline.

Next, a multi-task objective loss function 250 is jointly minimized by minimizing the location errors of RoIs on the ground plane. This is achieved by reprojecting the RoIs and ground-truth back onto the 3D space, and may be referred to herein as late fusion of the geometric context with the classification pipeline.

A sampling step may occur prior to performing the loss function. In some examples, this may include randomized stratified sampling. Subsets of foreground, background, & occluded regions are sampled for the loss function. After the loss function is minimized, the data may be fed back to RPN 235, which may include a class agnostic stage where it is determined whether or not the RoI includes an object, followed by a stage that includes class-specific bounding box regression.

The geometric context may be determined at 215 by inference from image data cues. Such an inference process may be particularly applicable to scenarios wherein a static camera captures wide-angle views of crowded scenes. In such scenarios, performing a simple, one-time camera pose estimation can provide rich spatial cues about the objects in space. In particular, knowing the camera pose with reference to the ground plane allows for performing depth ordering of objects and transforming points between the image plane and the ground plane, up to scale.

As an example, a geometric algorithm may be used to compute camera extrinsics from scene cues. The camera projection matrix P=[R, t] may be parameterized based on its angle of view and the height above ground plane. These parameters may be solved using concepts from single view geometry. As an example, assume a pinhole camera model is observing a so-called "Manhattan world", with known camera intrinsics K For the camera angle, a few line segments may be annotated to compute the vanishing point in z-direction $v_z$. Assuming zero roll, the horizon line is the corresponding image row $v_0$. The rotation vector is $\hat{r}_3 = K^{-1}v_z/K^{-1}v_z$, which can be matched to the rotation matrix to recover the yaw=$\tan^{-1}(\hat{r}_{31}/\hat{r}_{33})$ and pitch=$\cos^{-1}(\hat{r}_{32})$ angles. For the camera height, let $y_c$ denote the camera height in world coordinates. Given the image height $h_i$, bottom position $v_i$, and world (physical) height $y_i$ of a known object, the camera height $y_c$ is computed using this formulation $y_c = y_i(v_i - v_0)/h_i$. The camera height estimates may be averaged over multiple object instances in the scene to get a robust estimate.

Figure 3:
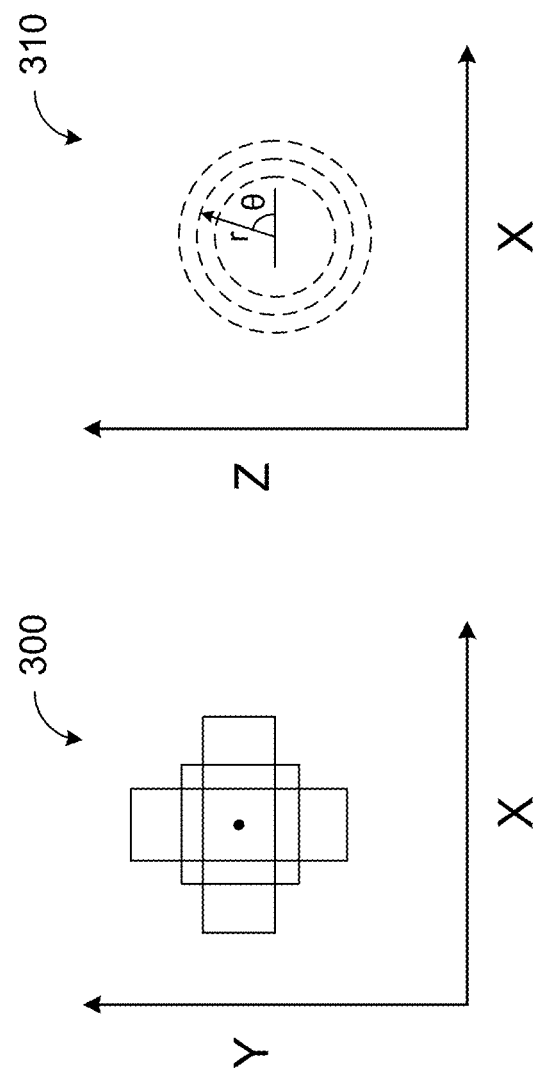
FIG. 3 shows example plots for anchor generation during object detection.

FIG. 3 shows example plots depicting anchor placement for object detection. Plot 300 represents anchor placement for a conventional object detector. The classifier looks at the scene in the XY image plane, determines prospective regions of interest, and then places bounding boxes on the image. In training examples, the Regions of Interest may be determined based at least in part based on ground-truth data. High confidence bounding boxes may be assumed to be associated with objects in the foreground, and thus have a high likelihood of occluding other objects in the scene.

Plot 310 represents anchor placement for occluding objects. To determine where to place the anchors, in some examples, once an occluder is identified, an occlusion zone may be generated, and then multiple RoIs may be proposed based on the occlusion zone. Bounding boxes are then built around the original bounding box for the occluder. As shown at 310, XZ represents the ground plane. Concentric circular regions are drawn in XZ based on locations of potential occluders. Scene cues may be used to build anchors, and the Y dimension is known from the bounding boxes drawn in the XY plane. Thus, the anchored bounding boxes may be projected to the XZ ground plane.

In this example, concentric circles are drawn around the ground plane. The circles may be used to generate ground touch points, and then anchors may be placed at those locations. In other examples, any other suitable shape may be used. New bounding boxes may be placed within a cone behind the occluder relative to the camera. Each of the new bounding boxes is anchored to one of the concentric circles at the intersection of the LoS and the circle. The associated anchors join the original anchors in the regression stage of the model.

Figure 4:
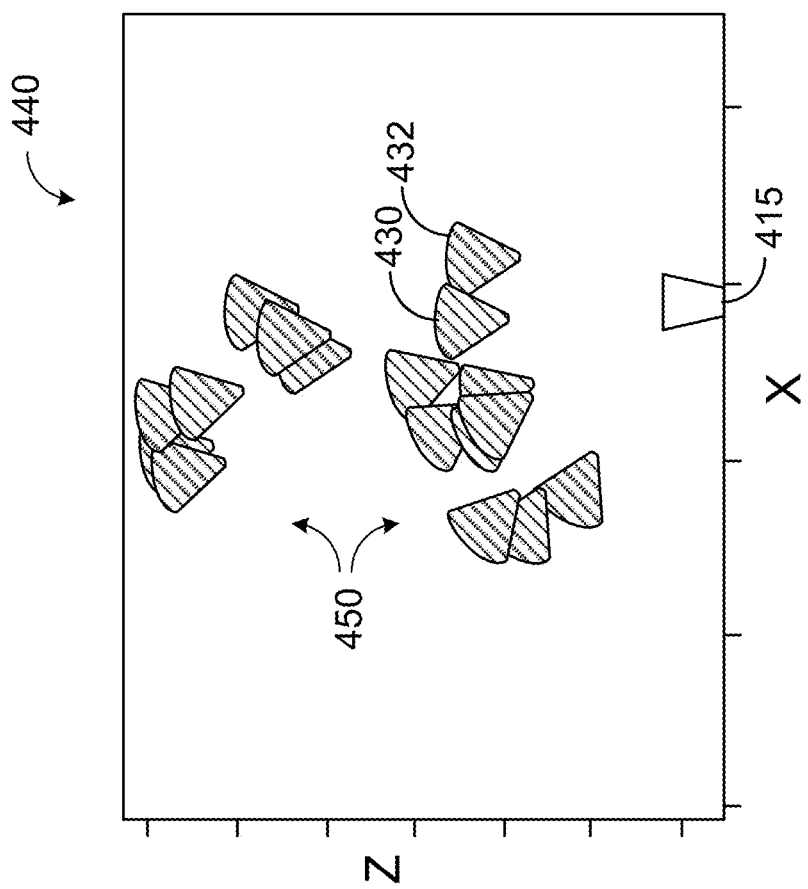
FIG. 4 shows example occlusion zones generated for potential occluders within a scene.
Figure 4:
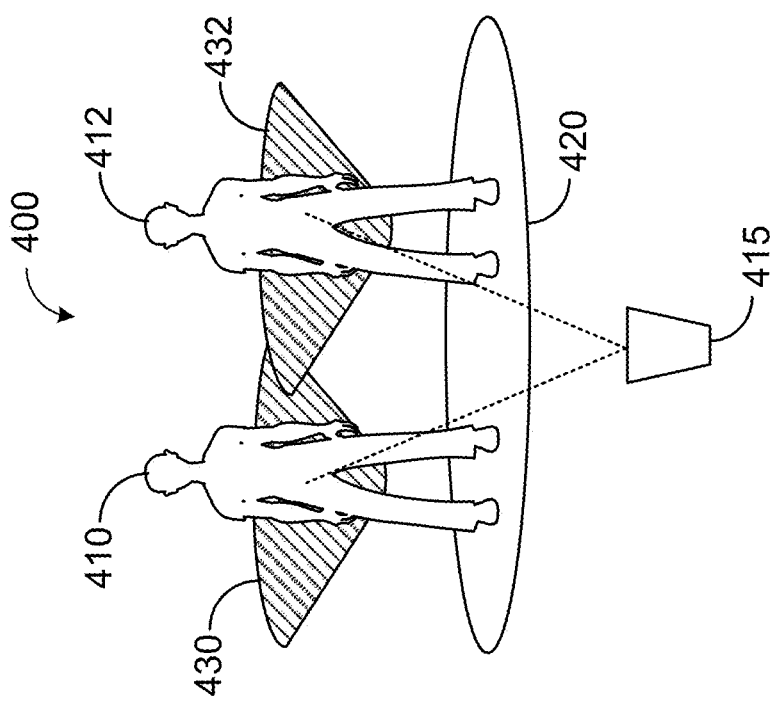

FIG. 4 depicts examples of occlusion zone generation. In scene 400, two occluders 410 and 412 are shown positioned relative to camera 415 and ground plane 420. Occluder-centric anchors may be generated that are identified by their positions relative to foreground occluders 410 and 412, as well as the scene-specific layout. In particular, occlusion occurs when multiple objects appear along the line of sight (LoS) of the camera at different depths.

A cone shaped space behind the occluder encloses the occlusion zone in 3D. For example, occlusion cone 430 is generated behind occluder 410, and occlusion cone 432 is generated behind occluder 412. A object occupying occlusion cones 430 and 432 may manifest as partially visible in the 2D image data. For example, plot 440 shows an example x-z projection (bird's-eye view) of scene 400 including camera 415 and occlusion cones 430 and 432. Each occlusion cone is generated based on real world size, as region proposals are projected onto 2D image based on that size. Each occlusion cone may be defined by a set of parameters, for example, x, z, r, and θ, as shown in FIG. 3, where θ is an angle based on the occluder's line of sight.

Figure 5:
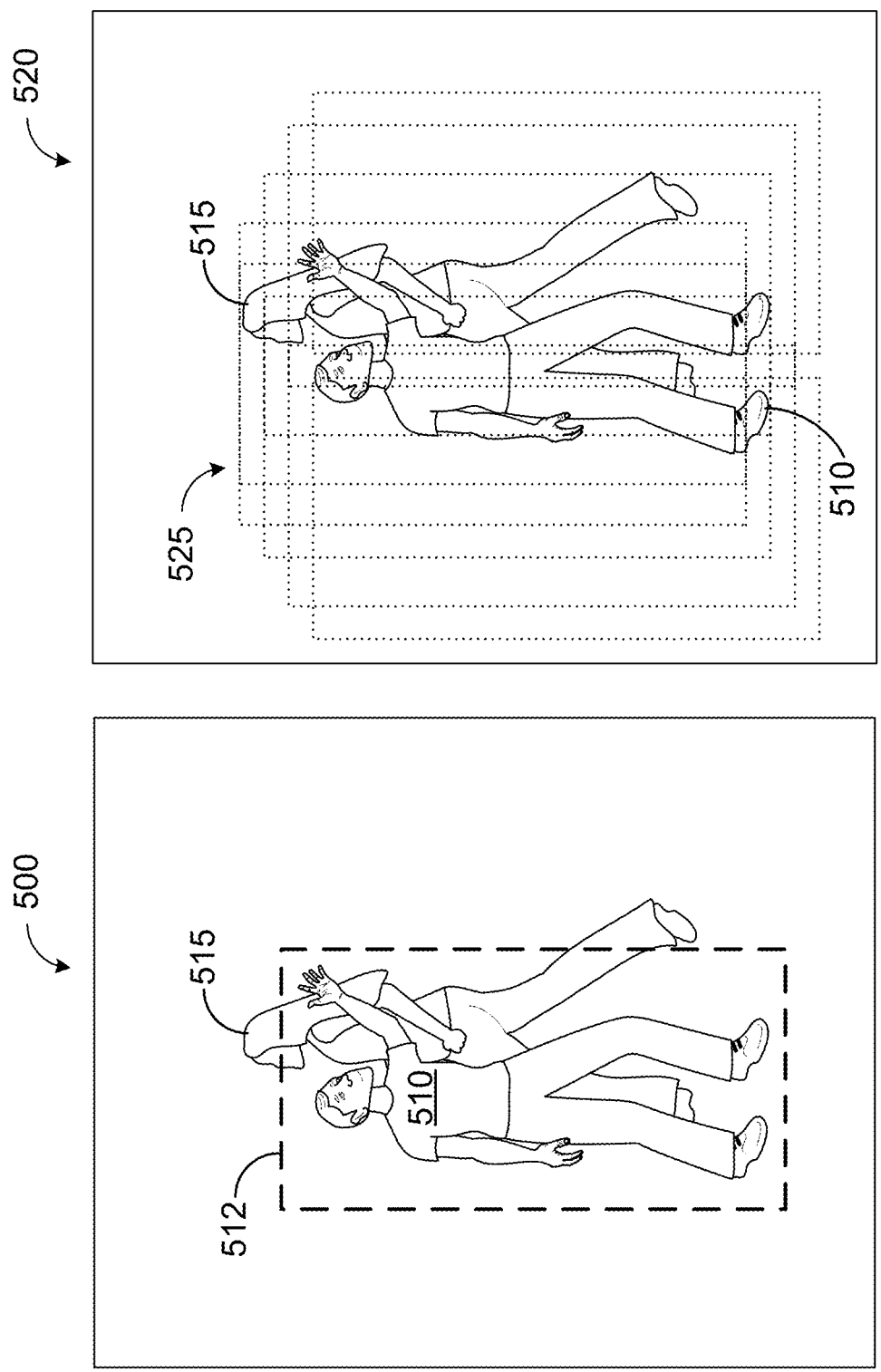
FIG. 5 shows example bounding boxes generated for a foreground occluder and accompanying occlusion zones.

Occluder-centric anchors may be generated as dense anchors that appear within occlusion cones. For example, at 500, FIG. 5 shows an example occluder 510 with a foreground bounding box 512. Bounding box 512 includes portions of occluded individual 515. Bounding boxes may be generated based on at least the scene geometry, the relative sizes of the occluders, and occlusion cones. An example is shown at 520, wherein a plurality of bounding boxes 525 are generated for an occlusion cone (not shown) for occluder 510. These bounding boxes may be placed within the 3D geometry, then projected back to 2D. As one example, 2D bounding boxes may be projected onto the ground plane using the known or inferred camera matrix. This may help to positively classify occluded individual 515 in at least one of bounding boxes 525. The new boxes cover less of the occluder and more of the wings of the occlusion cones. In this way the directive of the attention mask for the classifier is adjusted, pushing attention to wing regions and away from the occluding object.

Region proposals in two-stage object detectors mimic sliding window searches across all scales and aspect ratios, and are drawn from a fixed set of anchors that are constant across all images. During the RPN stage, anchors are classified into foreground and background classes based on their degree of overlap with ground-truth boxes. In the described examples herein, the anchors generated for occluded zones are also fed to the RPN stage. By doing this, location sensitive occluded RoIs are explicitly prioritized during training.

As an example, let $(x_o, z_o)$ be a touch point of a bounding box on the ground. The LoS is the ray connecting the camera center to this point. Let the angle of this LoS be $\theta_{los,o}$. Then, the occlusion cone corresponding to this box can be parameterized as $(x_o, z_o, r, \theta)$, where r denotes the radial distance from o and $\theta = \theta_{los,o} \theta_\Delta, \ldots, \theta_{los,o} + \theta_\Delta$ denotes the angular separation from the LoS.

Next, at each parameterized location $(x_o, z_o, r, \theta)$, hypothetical RoIs are generated corresponding to expected human dimensions. Specifically, given $(r, \theta)$, the 3D positions of top left and bottom right positions in 3D are $(x_o - w/2, h, z_o)$ and $(x_o + w/2, 0, z_o)$, where $(h, w)$ are expected height and width of humans (h=5.6 feet, w=1.7 feet, approx.). These 3D boxes may then be re-projected back onto image plane in form of 2D RoIs. The anchors that overlap these RoIs may be indexed by corresponding $(r, \theta)$ values. Finally, a subset of these anchors may be uniformly sampled from the $(r, \theta)$ distribution.

Following the proposal annotation stage, $b_{fg}$, $b_{occ}$, $b_{bg}$ may be designated as the random subsets of foreground, occluded and background anchors. The combined loss function at the region classifier stage is expressed as follows:

$$\mathcal{L}_F = \lambda_{fg} \mathcal{L}_\sigma^\ell {}_1(\mathcal{F}(b_{fg}^{(c)}), C) + \lambda_{occ} \mathcal{L}_\sigma^\ell {}_1(\mathcal{F}(b_{occ}^{(c)}), C) + \lambda_{bg} \mathcal{L}_\sigma(\mathcal{F}(b_{bg}))$$

Equation 1 where λ is the appropriate scaling function per proposal set, σ, 11 denotes the combination of softmax loss for class probability and smooth-L1 loss for bounding box regression between a proposal and the corresponding ground-truth box, C. Background proposals do not carry a box regression penalty.

This stage ends with bounding box regression, but classification has not yet been done. The classification stage may perform better following a 2nd regression having a smaller set of boxes. Introducing a geometric loss term helps to ensure that the touch point of the proposal is suitably close to that of the corresponding ground truth box. This may be accomplished by calculating projection matrixes through the established geometric context.

Figure 6:
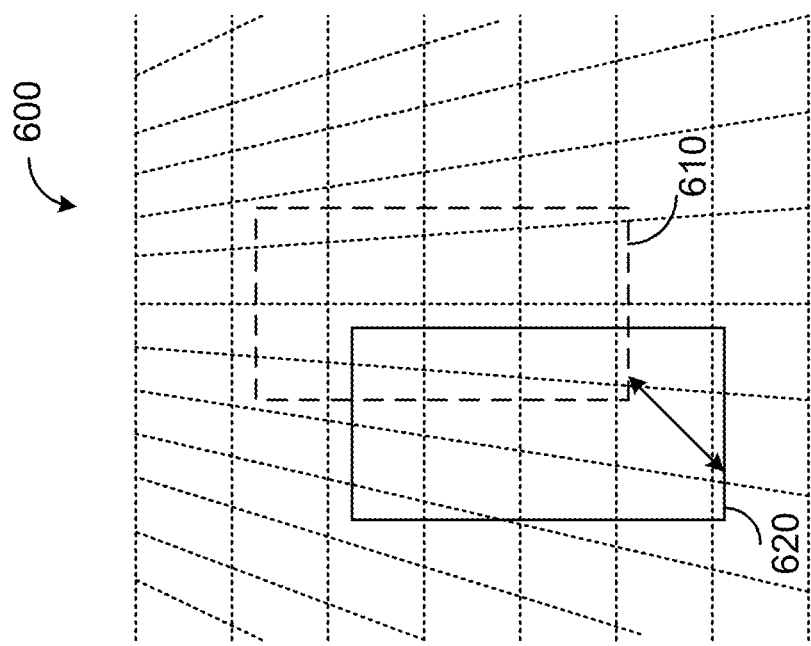
FIG. 6 schematically shows an example of 3D projection loss.

For example, FIG. 6 shows an example scene 600 including an occlusion bounding box 610 and an image plane bounding box 620. Occlusion bounding box 610 is generated as a projection of image plane bounding box 620 into 3D along the Z axis. However, occlusion bounding box 610 must eventually be evaluated in the image plane for classification. As such, occlusion bounding box 610 may be projected backwards from 3D to 2D using an inverse projection matrix to generate an estimated bounding box in the image plane. To effectively accomplish this projection, it is desirable for the distance function to be minimized through back propagation.

In Equation 1, a multi-task loss $\mathcal{L}_\sigma^\ell$ includes a classification loss that penalizes object category mismatch, and a regression loss that penalizes offsets of an anchor box to a nearby ground-truth in pixels. In addition, a geometric loss may be incorporated that encodes the position consistency of anchors on the ground.

In Faster-RCNN, the regression target is parameterized into four dimensions through a convolutional subnetwork bbox_reg as $t_x = (x_g - x_a)/w_a$, $t_y = (y_g - y_a)/h_a$, $t_w = \log(w_g/w_a)$, $t_h = \log(h_g/h_a)$, where $(.)_g$ and $(.)_a$ indicate ground-truth and anchor, respectively, and (x, y) are the box mid-points and (w, h) are the corresponding width and height. The technique in R-FCN is similar, except that position sensitive maps are used as intermediate representations. In both approaches, anchor boxes are matched to ground-truth boxes based on Intersection over Union (IoU) overlap. The bbox_reg subnet is expected to learn a small offset that "corrects" the anchor position and aligns them perfectly. However, good anchor candidates might be farther from the object than can be learnt through the corrective offsets. Some bounding boxes may have significant overlap with the selected ground-truth, but are equidistant to neighboring ground-truths. This leads to coarse localization as multiple ground-truth boxes compete for the same anchor set.

Given the camera pose with reference to the ground plane, a projection loss function may be introduced that attempts to resolve these issues by expanding the regression criterion. To achieve this, two additional dimensions are added to the regression target that predict the normalized distance between anchor and object in $x_w$ and $z_w$, i.e., $t_x^w = (tpx_g - tpx_a)/g_x$ and $t^w = (tpz_g - tpz_a)/g_z$, where tp( ) denotes the touch points of bounding boxes projected in the x-z dimensions of the ground plane.

In order to establish targets for regression, 2D box coordinates (x, y) need to be projected to locations $(x_w, y_w, z_w)$ on the ground plane. While exact recovery of 3D from 2D points is ill-posed, two reasonable assumptions aid in making the solution tractable: (a) pedestrians rest on ground plane, i.e., $y_w = 0$; and (b) the direction of ground plane is parallel to an upright person, i.e., $\hat{G} = (0, 1, 0)$. Based on these constraints, the position of an RoI on the ground plane (denoted by $G(b)_{yw} = 0$) is computed algebraically as follows: (a) find the camera center, given by the null space of the camera matrix P=null (P); (b) the ray emanating from the camera center to the object is given by R=inv (P)*$X_{im}$, where $X_{im}$ is the bottom coordinate of an image box; and (c) the intersection between the projected ray R and the ground unit vector $\hat{G}$ is computed algebraically to give the corresponding touch point $X_g$ on the ground.

Figure 7:
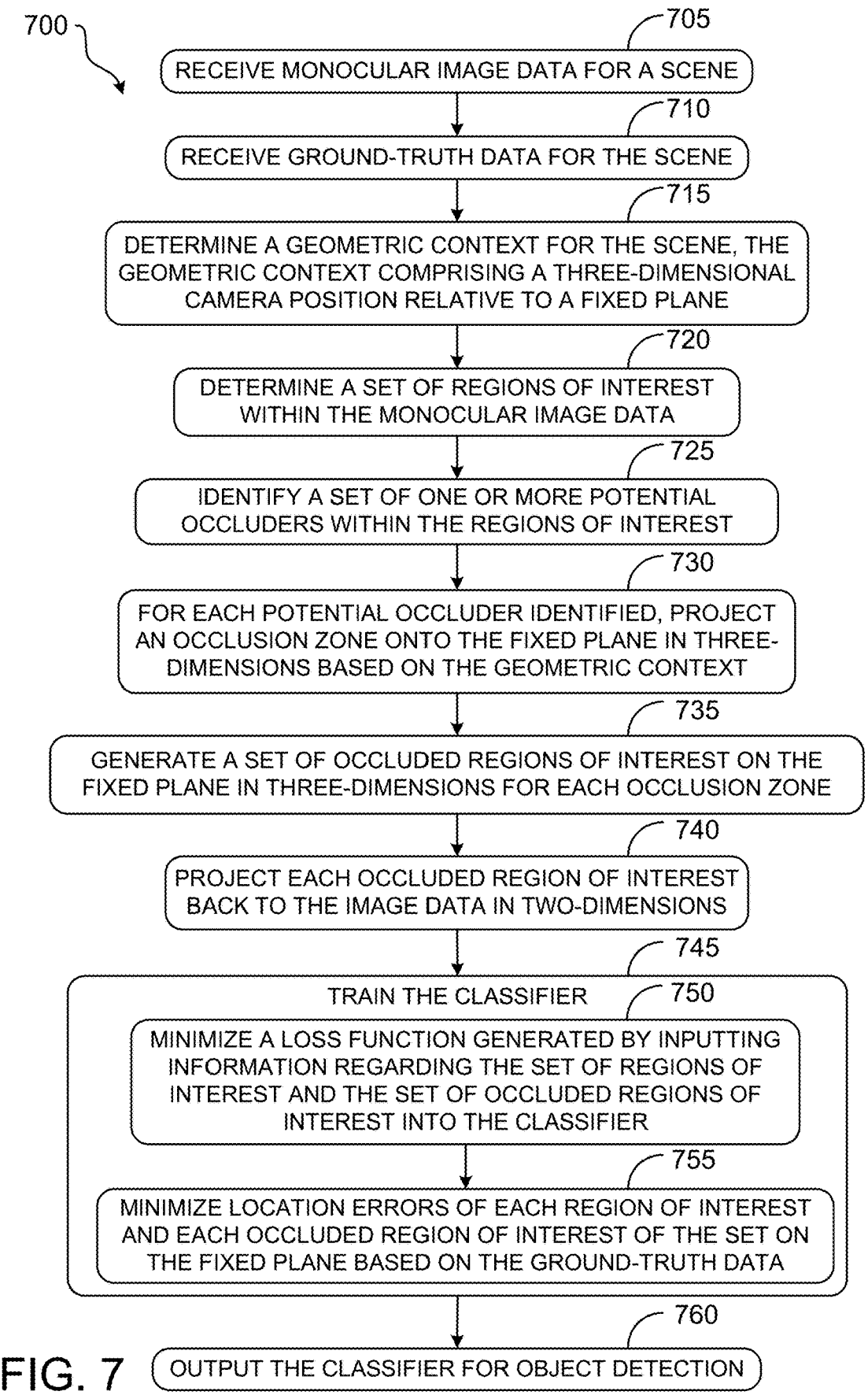
FIG. 7 shows a flow-chart for an example method of training a classifier using geometric context.

Given the 3D position of the bounding boxes, the 2D+3D regression loss can be evaluated. Let the set of foreground and occluded anchors, $\{b_{fg}, b_{occ}\}$ as computed above, and the corresponding ground-truth boxes be C. Then, the offsets are penalized through a smooth L1 function. The predicted feature map $\mathcal{F}$ is expanded to accommodate regression terms along the two dimensions, normalized by the width and height of the ground plane, respectively.

$$\mathcal{L}_{2D+3D} = \Sigma_{b \in nR} \mathcal{L}_{l1}(\mathcal{F}_{2D}(b), t_{b,2D}{}^g) + \mathcal{L}_{l1}(\mathcal{F}_{3D}(b), t_{b,3D}{}^g), \quad \text{Equation 2}$$

where $t_{b,3D}{}^{g,w} = \{[\mathcal{G}(b_{gt}{}^w)]_{yw=0} - \mathcal{G}(b_a{}^w)_{yw=0}\}/W$ FIG. 7 depicts a flow chart for an example method 700 for training a classifier to classify objects. Method 700 may be executed by one or more computing systems, and may be result in the output of a classifier and/or classification module that may be appended to object detection and classification systems, such as deep neural networks.

At 705, method 700 includes receiving monocular image data for a scene. Monocular image data may include one or more digital images of a scene taken from a static camera position. At 710, method 700 includes receiving ground-truth data for the scene. The ground-truth data may include previously appended data describing and parsing the image data. For example, the ground-truth data may include a number of objects represented within the image data, may include previously generated Regions of Interest, etc. The ground-truth data may also include additional information about the scene, such as scene footprint, background information, and/or additional data pertinent to object detection within the monocular image data.

At 715, method 700 includes determining a geometric context for the scene, the geometric context comprising a three-dimensional camera position relative to a fixed plane. In some examples, the fixed plane may be a ground plane. In some examples, determining geometric context for the scene may include extracting the three-dimensional camera position relative to the fixed plane from the ground-truth data. In some examples, determining geometric context for the scene may include deriving the three-dimensional camera position relative to the fixed plane from the monocular image data, as described herein.

At 720, method 700 includes determining a set of regions of interest within the monocular data. The set of regions of interest may be determined in any suitable manner, and/or may be included within the ground-truth data for the scene. Each region of interest may include an anchor, size and shape data for the object in question, and/or other data that may be used to generate a region of interest for downstream analysis.

At 725, method 700 includes identifying a set of one or more potential occluders within the regions of interest. For example, the one or more potential occluders may be determined based on a confidence level for a region of interest being greater than a threshold. In other words, if there is a high likelihood that a region of interest contains a majority of an object, and that object is likely to be in direct line of sight to the camera, it may be identified as a potential occluder to objects further in the background.

At 730, method 700 includes, for each potential occluder identified, projecting an occlusion zone onto the fixed plane in three-dimensions based on the geometric context. Projecting an occlusion zone may include generating occlusion cone in three dimensions based on the geometric context. As described with regard to FIGS. 3 and 4, the occlusion cone may be determined based on a radial distance to an anchor point, and an angular separation of the from the line of sight between the camera and the anchor point and the fixed plane.

At 735, method 700 includes generating a set of occluded regions of interest on the fixed plane in three-dimensions for each occlusion zone. For example, generating a set of occluded regions of interest may include projecting regions of interest onto the fixed plane of the occlusion cone based on the geometric context, as described with regard to FIG. 5. Additionally, at 740, method 700 includes projecting each occluded region of interest back to the image data in two dimensions.

At 745, method 700 includes training the classifier. Training the classifier includes, at 750, minimizing a loss function generated by inputting information regarding the set of regions of interest and the set of occluded regions of interest into the classifier. As an example, foreground, background, and occluded regions of interest may be sampled to generate a set of each type of RoI. Minimizing the loss function may then include modeling object position and scale consistency during per region loss computations for each of foreground, background and occluded regions of interest. The technical effect of training the classifier in this way is a reduction in classification error rate.

At 755, training the classifier includes minimizing location errors of each region of interest and each occluded region of interest of the set of the fixed plane based on the ground-truth data. Minimizing location errors may include reprojecting each of foreground, background, and occluded regions of interest and ground-truth back onto the 3D space. In this way, the estimated regions of interest may be regressed to known object locations by penalizing offsets of misplaced anchors.

At 760, method 700 includes outputting the classifier for object detection. The classifier may include one or more proposal-based deep neural networks, convolutional neural networks, or other neural network type. In some examples, method 700 includes outputting a module that may be integrated into a plurality of two-stage object detection architectures.

Figure 8:
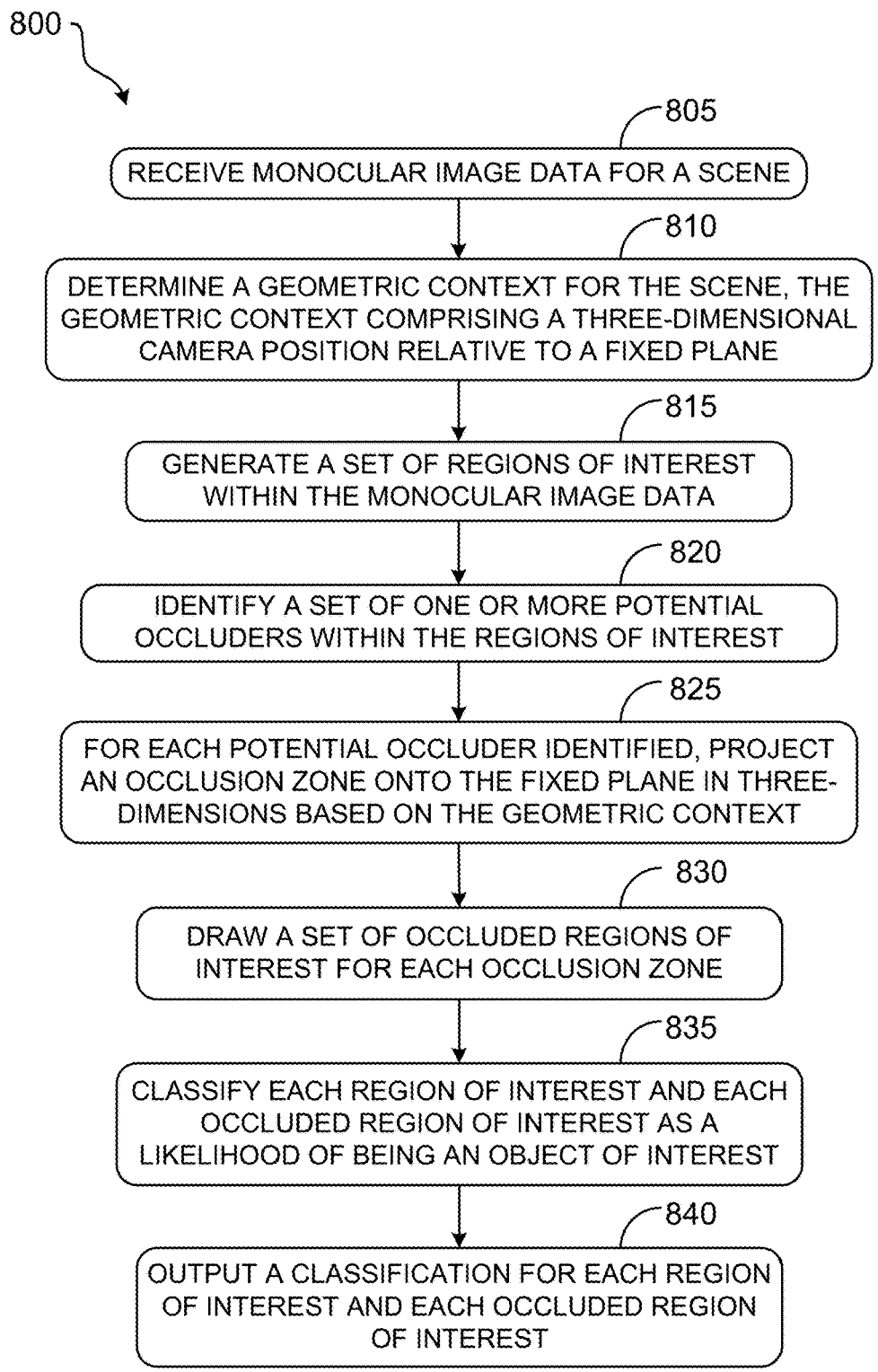
FIG. 8 shows a flow-chart illustrating an example method of operating a classifier trained using geometric context.

FIG. 8 depicts a flow chart for an example method 800 for deploying a trained classifier, such as a classifier trained via method 700. Method 800 may be executed by one or more computing systems, cloud computing systems, web apps, or other platforms executing a two-stage object detection and classification model.

At 805, method 800 includes receiving monocular image data for a scene. Monocular image data may include one or more digital images of a scene taken from a static camera position. At 810, method 800 includes determining a geometric context for the scene, the geometric context comprising a three-dimensional camera position relative to a fixed plane. In some examples, determining geometric context for the scene may include deriving the three-dimensional camera position relative to the fixed plane from the monocular image data, as described herein. The fixed plane may be the ground plane or other suitable plane.

At 815, method 800 includes generating a set of regions of interest within the monocular data, for example, by generating a set of RoIs within the image data, and then filtering the RoIs via one or more region proposal networks trained on the desired objects. For example, each region of interest may be designated by drawing a bounding box on the monocular image data for each region of interest. Each region of interest may be fit around a prospective object by a region proposal network. The size of the region of interest may be based on the size of the desired objects. The position of the region of interest may be based on the geometric context, e.g., anchored to the fixed plane.

At 820, method 800 includes identifying a set of one or more potential occluders within the regions of interest. For example, the one or more potential occluders may be determined based on a confidence level for a region of interest being greater than a threshold. In other words, if there is a high likelihood that a region of interest contains a majority of an object it may be identified as a potential occluder to objects further in the background.

At 825, method 800 includes, for each potential occluder identified, projecting an occlusion zone onto the fixed plane in three-dimensions based on the geometric context. Projecting an occlusion zone may include generating occlusion cone in three dimensions based on the geometric context. As described with regard to FIGS. 3 and 4, the occlusion cone may be determined based on a radial distance to an anchor point, and an angular separation of the from the line of sight between the camera and the anchor point and the fixed plane.

At 830, method 800 includes drawing a set of occluded regions of interest for each occlusion zone. For example, generating a set of occluded regions of interest may include placing regions of interest onto the fixed reference plane along the occlusion cone based on the geometric context, as described with regard to FIG. 5. The regions of interest may then be back-projected from 3D space into 2D space.

At 835, method 800 includes classifying each regions of interest and each occluded regions of interest as a likelihood of being an object of interest. The classification criteria may be based in part on the geometric context. For example, an overhead camera may be less likely to capture the feet of a person, and thus this criteria may be minimized.

At 840, method 800 includes outputting a classification for each regions of interest and each occluded regions of interest. In examples where an object is partially included in multiple overlapping occluded regions of interest, an occluded region of interest with a highest likelihood may be indicated as likely to be the object of interest, while neighboring overlapping occluded regions of interest with lesser likelihoods may be designated as not containing the object of interest, so as to avoid duplicate counting of objects.

The above described example training algorithm was evaluated on two open-source pedestrian datasets—ETH WildTrack and MOT 2017 Detection (MOT). The WildTrack dataset comprises seven sequences of pedestrians from overlapping viewpoints with wide-angle static cameras having variable camera heights. The cameras were jointly calibrated and the corresponding camera intrinsics and extrinsics were available. The MOT dataset was used to test the example algorithm on ambient scenes. The MOT dataset comprises seven sequences of various indoor and outdoor pedestrian traffic. Scene calibration was performed using single view geometry (e.g., as described with regard to FIGS. 1 and 2) along with the inferred geometric parameters. Both datasets include captured video frames of crowded, dynamic scenes of moving pedestrians (~17 pedestrians per frame), using static cameras mounted at a variety of vantage points (e.g., surveillance view, below eye-level view, etc.) and provide full body annotations on all ground-truth instances. For evaluation, each video was partitioned temporally such that the first 60% of the frames were used for training and validation, while the remaining 40% were sequestered for testing.

The example algorithm was evaluated on two well-studied architectures—Region based Fully Convolutional Network (R-FCN) and Faster-RCNN, with the example algorithm on top of these pipelines.

All of the training experiments shared the same protocol. Resnet-101 was used as the backbone. The models are pre-trained on the COCO dataset, and fine-tuned by freezing all layers up until the 4th resnet block, and re-training all the layers thereafter. Training was performed using SGD with momentum of 0.9, a weight decay of 5e−4, an initial learning rate of 5e−5, and with a batch size of 1. Each training routine was allowed to run for 20 epochs. No hyperparameter tuning or data augmentation was performed. Intersection over Union (IoU) of 0.7 was used as a threshold for positive detection with mean average precision (mAP) as the evaluation metric.

A budget of 256 RoIs was set at the RPN stage. In baseline models, the proportion of foreground RoIs was set to 25%, and the remaining 75% are designated as background. In the example algorithm, occluded-RoIs accounted for 12.5% of total RoIs, making the ratio of foreground, occluded, and background RoIs to be 25:12.5:62.5. Occluded RoIs were sampled from (r, θ) distribution using uniform sampling. The occluded anchors were densely sampled by varying the distance to the occluder (r) and orientation along the line of sight (θ). Depending on the camera height, the radius ranged from 1-10 feet for an overhead camera view, and from 1-50 feet for horizontal and below eye-level views, each at increments of 1 foot. The angle of deviation from line of sight ranged from 0 to 60 degrees, at increments of 5 degrees. In order to project the anchors back onto the image plane, average human height was assumed to be 5.5 feet for MOT and 5.9 feet for Wildtrack (as provided in the datasets).

TABLE 1

| mAP | cam1 | cam2 | cam3 | cam4 | cam5 | cam6 | cam7 | avg |
|---|---|---|---|---|---|---|---|---|
| rfcn [3] | 78.0 | 73.9 | 77.6 | 60.9 | 82.0 | 74.2 | 72.5 | 75.8 |
| g-rfcn | 79.5 | 76.0 | 77.8 | 66.1 | 84.4 | 74.9 | 74.0 | 78.2 |
| frcnn [26] | 78.4 | 81.2 | 82.9 | 61.1 | 84.0 | 75.5 | 84.7 | 78.8 |
| g-frcnn | 80.4 | 80.6 | 83.4 | 69.7 | 85.2 | 77.9 | 84.7 | 80.1 |

TABLE 2

| mAP | mot2 | mot4 | mot5 | mot9 | mot10 | mot11 | mot13 | avg |
|---|---|---|---|---|---|---|---|---|
| rfcn [3] | 89.3 | 86.7 | 90.4 | 92.8 | 89.7 | 96.8 | 77.7 | 86.2 |
| g-rfcn | 90.9 | 91.3 | 91.8 | 94.3 | 91.3 | 96.3 | 83.4 | 93.0 |
| frcnn [26] | 89.7 | 89.5 | 92.0 | 94.9 | 88.1 | 96.9 | 78.3 | 90.2 |
| g-frcnn | 90.4 | 92.7 | 93.4 | 96.1 | 89.2 | 97.2 | 81.5 | 92.4 |

Figure 9:
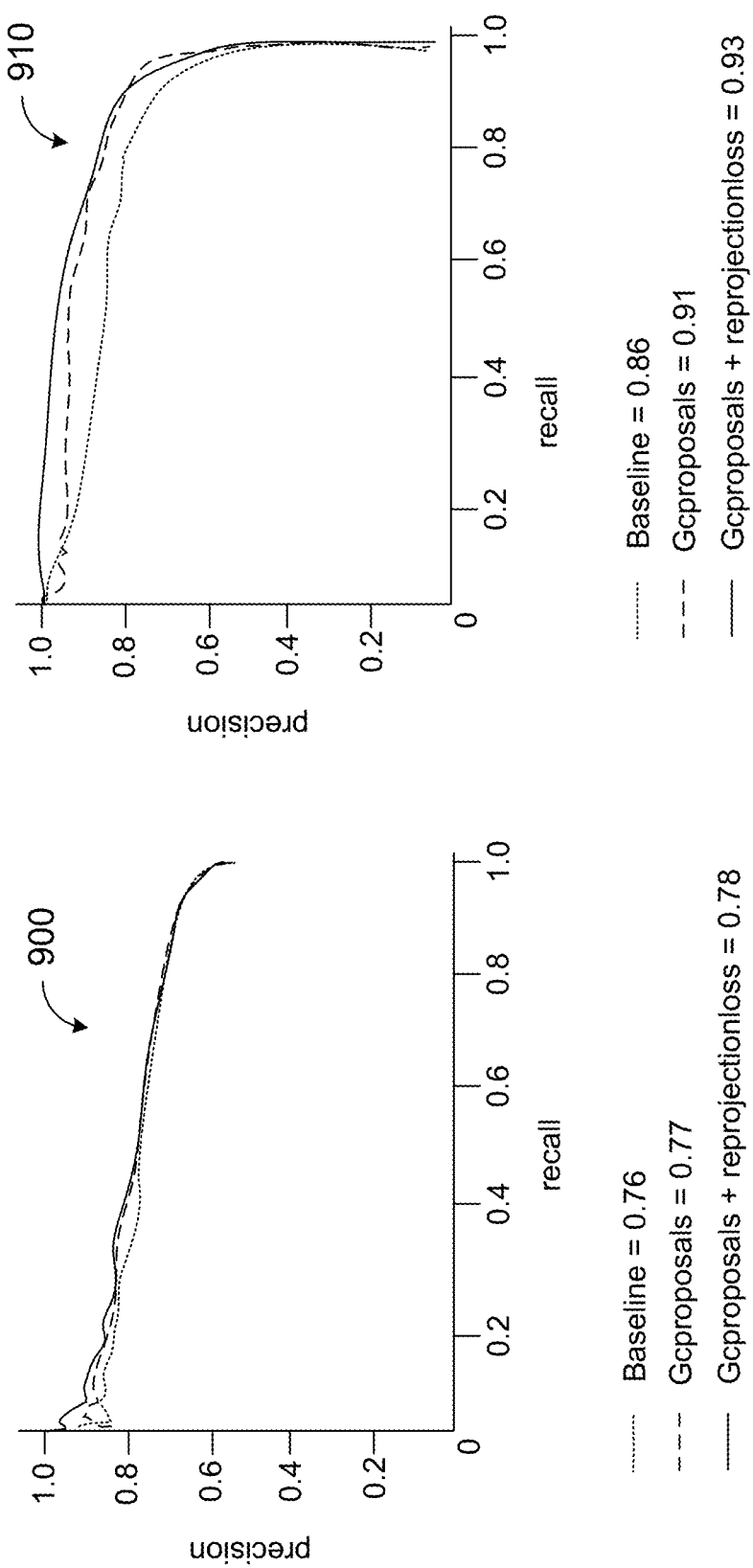
FIG. 9 shows precision recall curves of an example classification model trained on geometric context.

Using the example algorithm, a higher mAP was achieved across both datasets and detection architectures. As shown above in Tables 1 and 2, the baseline R-FCN achieved 75.24% on Wildtrack (Table 1) and 86.20% on MOT (Table 2). FIG. 9 shows precision recall curves for the geometric-RFCN model for Wildtrack (plot 900) and MOT (plot 910). Adding the example algorithm improved these scores to 93.02% on MOT and 78.16% on Wildtrack, an improvement of 8% and 3%, respectively. In the art, the performance of Faster RCNN has been observed to be better than R-FCN. Adding the example algorithm enabled outperformance of the baseline Faster RCNN model by 2% on an average. Tables 1 and 2 show the mAPs per camera view, the example algorithm consistently outperforming the baseline on all camera views. Interestingly, the mAP gains are higher for overhead views than for horizontal (eye-level) views.

As described herein, occluded samples may be better detected by the disclosed geometry primed method. These results are shown in Table 3. Indeed, a 17 percentage points (pp) gain was observed on Wildtrack and a 9 pp gain was observed on the MOT dataset. The gains in the occluded segments were significantly higher than the gains across the entire data set. This indicates that the occluded instances are better delineated using the example algorithm.

TABLE 3

|  | cam1 | cam2 | cam3 | cam4 | cam5 | cam6 | cam7 |
|---|---|---|---|---|---|---|---|
| baseline [3] | 35.7 | 26.2 | 47.4 | 10.3 | 34.5 | 19.7 | 49.1 |
| ours | 39.4 | 29.0 | 52.0 | 16.8 | 38.0 | 20.5 | 55.7 |
|  | mot2 | mot4 | mot5 | mot9 | mot10 | mot11 | mot13 |
| baseline [3] | 42.6 | 41.9 | 50.4 | 26.9 | 23.8 | 50.3 | 4.7 |
| ours | 45.0 | 52.6 | 51.4 | 27.8 | 25.1 | 50.7 | 5.8 |

Figure 10:
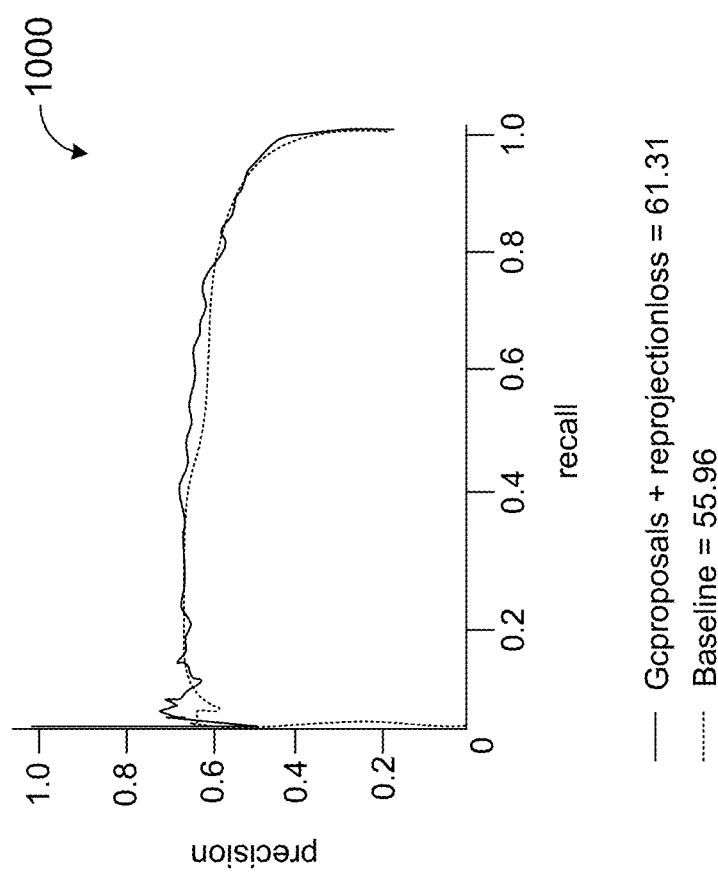
FIG. 10 is a plot indicating cross-camera performance of an example classification model trained on geometric context.

Cross-camera performance was evaluated on the Wildtrack data set to test if a superior model trained on a subset of views might also perform better on the unobserved views capturing the same underlying scene. Camera views C1-C4 were used for training, and views C5-C7 were tested. As shown in Table 4 and in plot 1000 of FIG. 10, the detection accuracy was improved by 2% on the unobserved views over baseline. The accuracy on the ground plane was also evaluated by measuring the average Euclidean distance between predicted locations and ground-truth in cm. A decrease of 15.3% in localization error was achieved compared to the baseline, as shown in Table 4 and in plot 1000 of FIG. 10.

TABLE 4

|  | C5 | C6 | C7 |
|---|---|---|---|
| mAP |  |  |  |
| frcnn | 62.9 | 47.5 | 60.8 |
| g-frcnn | 66.4 | 48.5 | 62.7 |
| Dist (cm) |  |  |  |
| frcnn | 148.4 | 883.4 | 60.7 |
| g-frcnn | 139.2 | 874.2 | 56.4 |

Figure 11:
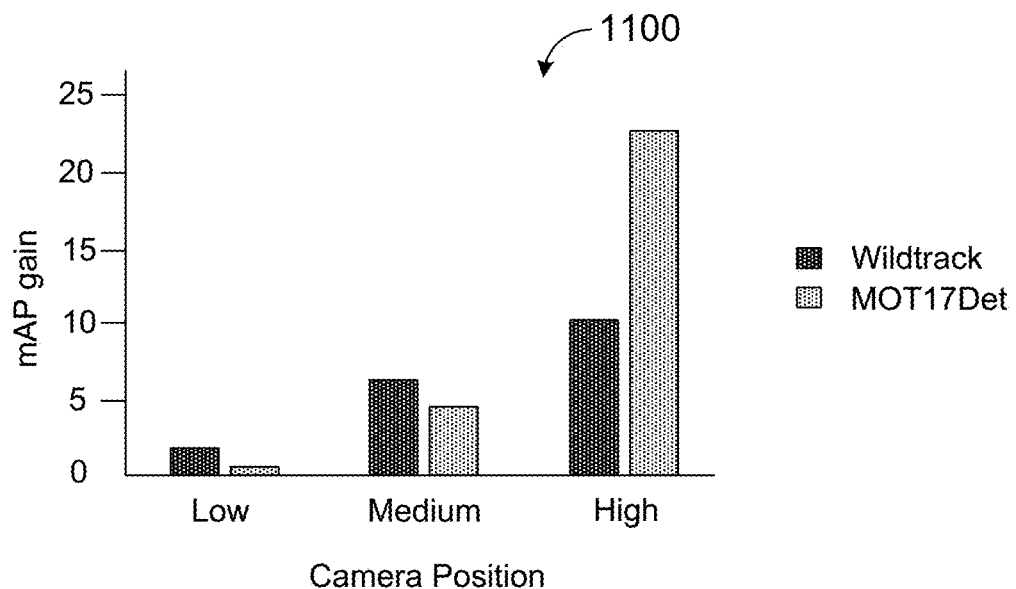
FIG. 11 depicts graphs showing mAP gains under occlusion with respect to camera elevation and radial distance.
Figure 11:
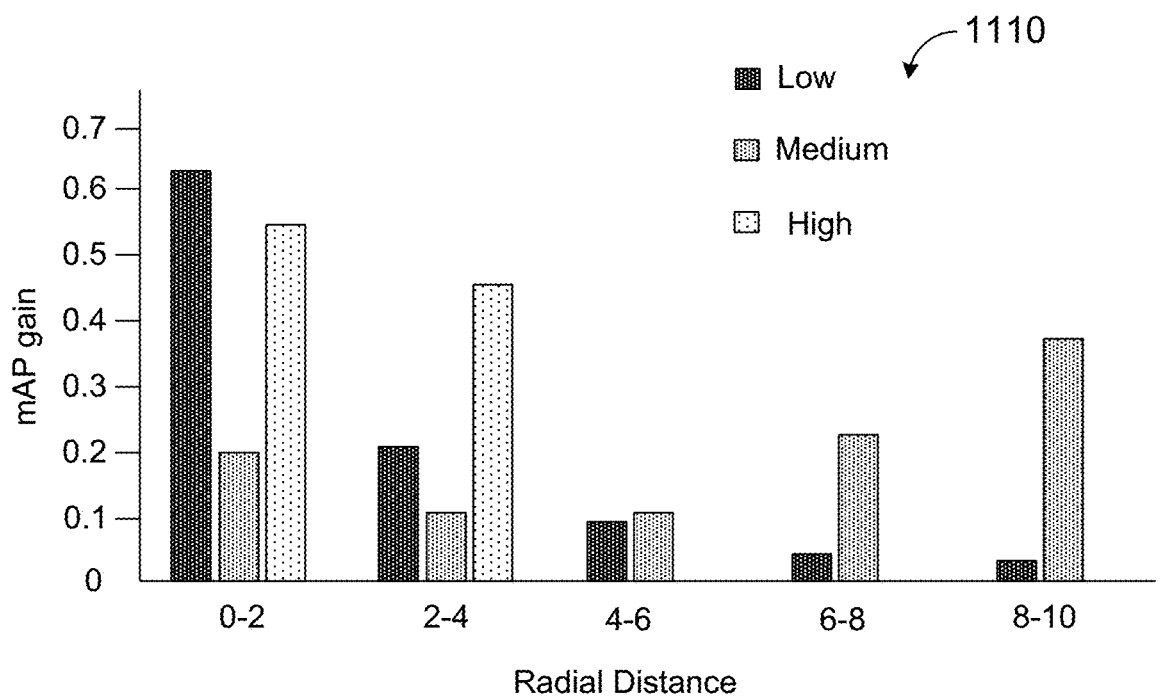

The mAP gains were then analyzed by camera elevation, inter spatial distance and radial angles between occluded objects on ground plane. This data is shown in graphs 1100 and 1110 depicted in FIG. 11. In graph 1100, camera elevation (x-axis) is shown to have a significant influence on the mAP gain. The higher the camera, the better the discloses model is able to represent occluded patterns. At eye level, a person might get completely occluded, thus making it harder to model the relationship using geometric constraints. For example, views MOT11, WT4 and WT6, all captured at eye-level, show lower mAP gains. This result mirrors why most surveillance cameras prefer overhead views for better scene capture. In graph 1110, gain is plotted with reference to an angle of deviation from the line of sight, where los=0° is directly behind the occluder. Low-level and overhead camera views show similar patterns—higher gains are achieved at a slight angular separation of ~15°. Intuitively, these samples are challenging to learn without explicit attention provided by the geometric context. In contrast, at eye-level gains are seen at larger radial separation, i.e., for side-by-side configuration.

Table 5 shows the results of an evaluation of the impact of individual design choices and modules in the example algorithm. In the first experiment, occluder-centric proposals were considered during inference alone, as shown in columns 1 and 2. Specifically, two rounds of inference were run with the pre-trained COCO model. In the second round, the top K detections from the first round were used, and occluder-centric proposals were generated that were centered at these detections. This strategy achieved a 41 point gain, from 48% in first round to 68% with augmented proposals, as shown in column 2. The gains were smaller for MOT, possibly because pedestrians appeared in a variety of poses that violate the occlusion patterns. Next, the example algorithm was evaluated by training with and without Online Hard Negative Mining (OHEM), as shown in columns 3 and 4. OHEM retroactively selected a subset of RoIs that have the highest loss and backpropagated based on the selected examples. Without OHEM, hard (occluded) ROIs were proactively selected. This strategy performed better than the examples with OHEM. Finally, the impact of occluder-centric proposals alone (early fusion of geometry) were evaluated, and the combined effect of occluder-centric proposals along with 3D geometric loss (early+late fusion) also were evaluated, as shown in columns 5 and 6. Each module individually improved the mAP, but the best performance was achieved by using both of the modules together, as shown in column 6.

TABLE 5

| mAP | Pretrained coco | Pretrained occluded RoIs | Fine-tune | Fine-tune+ | Train+ | Train + 3D |
|---|---|---|---|---|---|---|
| MOT | 82.23 | 84.38 | 86.23 | 90.07 | 91.29 | 93.02 |
| WT | 48.19 | 68.46 | 75.87 | 75.95 | 77.29 | 78.16 |

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
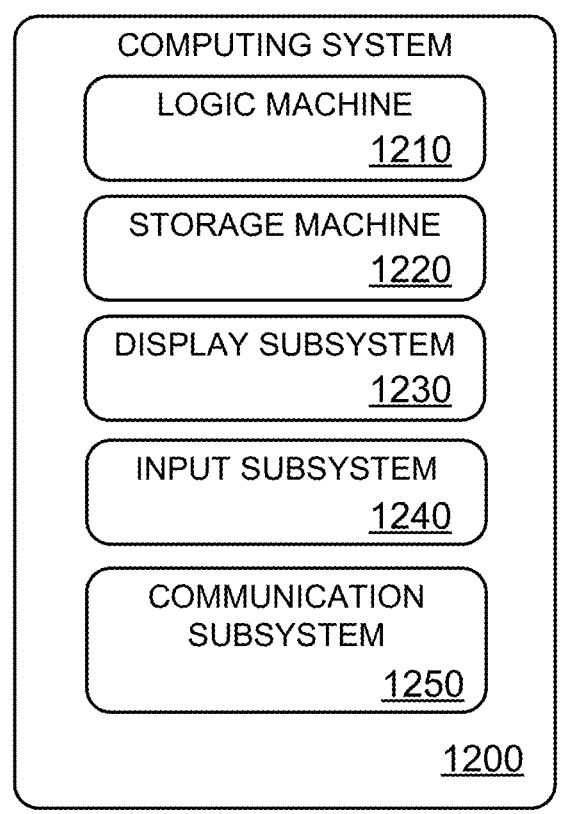
FIG. 12 schematically shows an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices.

Computing system 1200 includes a logic machine 1210 and a storage machine 1220. Computing system 1200 may optionally include a display subsystem 1230, input subsystem 1240, communication subsystem 1250, and/or other components not shown in FIG. 12.

Logic machine 1210 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1220 includes one or more physical devices configured to hold instructions executable by the logic machine to implement the methods and processes described herein. When such methods and processes are implemented, the state of storage machine 1220 may be transformed—e.g., to hold different data.

Storage machine 1220 may include removable and/or built-in devices. Storage machine 1220 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1220 may include volatile, nonvolatile, dynamic, static, read/write, read-only, random-access, sequential-access, location-addressable, file-addressable, and/or content-addressable devices.

It will be appreciated that storage machine 1220 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1210 and storage machine 1220 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 implemented to perform a particular function. In some cases, a module, program, or engine may be instantiated via logic machine 1210 executing instructions held by storage machine 1220. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1230 may be used to present a visual representation of data held by storage machine 1220. This visual representation may take the form of a graphical user interface (GUI). As the herein described methods and processes change the data held by the storage machine, and thus transform the state of the storage machine, the state of display subsystem 1230 may likewise be transformed to visually represent changes in the underlying data. Display subsystem 1230 may include one or more display devices utilizing virtually any type of technology. Such display devices may be combined with logic machine 1210 and/or storage machine 1220 in a shared enclosure, or such display devices may be peripheral display devices.

When included, input subsystem 1240 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1250 may be configured to communicatively couple computing system 1200 with one or more other computing devices. Communication subsystem 1250 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

As an example, a computing system for training a classifier to classify objects, comprises a logic machine; and a storage machine holding instructions that, when executed, cause the logic machine to: receive monocular image data for a scene; receive ground-truth data for the scene; determine a geometric context for the scene, the geometric context comprising a three-dimensional camera position relative to a fixed plane; determine a set of regions of interest within the monocular image data; identify a set of one or more potential occluders based on the set of regions of interest; for each potential occluder identified, project an occlusion zone onto the fixed plane in three-dimensions based on the geometric context; generate a set of occluded regions of interest on the fixed plane in three-dimensions for each occlusion zone; project each occluded region of interest back to the image data in two-dimensions; train the classifier by minimizing a loss function generated by inputting information regarding the set of regions of interest and the set of occluded regions of interest into the classifier, and minimizing location errors of each region of interest and each occluded region of interest of the set on the fixed plane based on the ground-truth data; and output the classifier for object detection. In such an example, or any other example, the fixed plane may additionally or alternatively be a ground plane. In any of the preceding examples, or any other example, the instructions may additionally or alternatively be executable to determine the geometric context for the scene by extracting the three-dimensional camera position relative to the fixed plane from the ground-truth data. In any of the preceding examples, or any other example, the instructions may additionally or alternatively be are executable to determine the geometric context for the scene by deriving the three-dimensional camera position relative to the fixed plane from the monocular image data. In any of the preceding examples, or any other example, the instructions may additionally or alternatively be executable to determine the one or more potential occluders based on a confidence level for a region of interest being greater than a threshold. In any of the preceding examples, or any other example, the instructions may additionally or alternatively be executable to project the occlusion zone by generating an occlusion cone in three dimensions based on the geometric context. In any of the preceding examples, or any other example, the instructions may additionally or alternatively be executable to generate the set of occluded regions of interest by projecting bounding boxes onto the fixed plane of the occlusion cone based on the geometric context. In any of the preceding examples, or any other example, the instructions may additionally or alternatively be executable to minimize the loss function by modeling object position and scale consistency during per region loss computations for each of foreground, background, and occluded regions of interest. In any of the preceding examples, or any other example, minimizing location errors may additionally or alternatively include reprojecting each of foreground, background, and occluded regions of interest and ground-truth back onto the 3D space. In any of the preceding examples, or any other example, the classifier may additionally or alternatively comprise one or more proposal-based deep neural networks.

In another example a computing system for performing object detection, comprises a logic machine; and a storage machine holding instructions that, when executed, cause the logic machine to: receive monocular image data for a scene; determine a geometric context for the scene, the geometric context comprising a three-dimensional camera position relative to a fixed plane; generate a set of regions of interest within the monocular image data; identify a set of one or more potential occluders within the set of regions of interest; for each potential occluder identified, project an occlusion zone onto the fixed plane in three-dimensions based on the geometric context; draw a set of occluded regions of interest for each occlusion zone; classify each region of interest and each occluded region of interest as a likelihood of being an object of interest; and output a classification for each region of interest and each occluded region of interest. In such an example system, or any other example system, the fixed plane may additionally or alternatively be a ground plane. In any of the preceding examples, or any other example, the instructions may additionally or alternatively be executable to determine the geometric context for the scene by deriving the three-dimensional camera position relative to the fixed plane from the monocular image data. In any of the preceding examples, the instructions may additionally or alternatively be executable to determine the set of one or more potential occluders based on a confidence level for a region of interest being greater than a threshold. In any of the preceding examples, or any other example, the instructions may additionally or alternatively be executable to project an occlusion zone by generating an occlusion cone in three dimensions based on the geometric context. In any of the preceding examples, or any other example, the instructions may additionally or alternatively be executable to generate the set of occluded regions of interest by projecting regions of interest onto the fixed plane of the occlusion cone based on the geometric context. In any of the preceding examples, or any other example, the instructions may additionally or alternatively be executable to classify each region of interest and each occluded region of interest by applying classification criteria that are based in part on the geometric context.

In yet another example a method for training a classifier to classify objects comprises receiving monocular image data for a scene; receiving ground-truth data for the scene; determining a geometric context for the scene, the geometric context comprising a three-dimensional camera position relative to a ground plane; determining a set of regions of interest within the monocular image data; identifying a set of one or more potential occluders based on the set of regions of interest; for each potential occluder identified, projecting an occlusion zone onto the ground plane in three-dimensions based on the geometric context; generating a set of occluded regions of interest on the ground plane in three-dimensions for each occlusion zone; projecting each occluded region of interest back to the image data in two-dimensions; training the classifier by minimizing a loss function generated by inputting information regarding the set of regions of interest and the set of occluded regions of interest into the classifier, and minimizing location errors of each region of interest and each occluded region of interest of the set on the ground plane based on the ground-truth data; and outputting the trained classifier for object detection. In any of the preceding example methods, or any other example method, projecting an occlusion zone may additionally or alternatively include generating occlusion cone in three dimensions based on the geometric context. In any of the preceding example methods, minimizing the loss function may additionally or alternatively include modeling object position and scale consistency during per region loss computations for each of foreground, background, and occluded regions of interest.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for training a classifier to classify objects, the computing system comprising:
 a logic machine; and
 a storage machine holding instructions that, when executed, cause the logic machine to:
  receive monocular image data for a scene;
  receive ground-truth data for the scene;
  determine a geometric context for the scene, the geometric context comprising a three-dimensional camera position relative to a fixed plane;
  determine a set of regions of interest within the monocular image data;

identify a set of one or more potential occluders based on the set of regions of interest;

for each potential occluder identified, project an occlusion zone onto the fixed plane in three-dimensions based on the geometric context;

generate a set of occluded regions of interest on the fixed plane in three-dimensions for each occlusion zone;

project each occluded region of interest back to the image data in two-dimensions;

train the classifier by
minimizing a loss function generated by inputting information regarding the set of regions of interest and the set of occluded regions of interest into the classifier, and
minimizing location errors of each region of interest and each occluded region of interest of the set on the fixed plane based on the ground-truth data; and
output the classifier for object detection.

2. The computing system of claim 1, wherein the fixed plane is a ground plane.

3. The computing system of claim 1, wherein the instructions are executable to determine the geometric context for the scene by extracting the three-dimensional camera position relative to the fixed plane from the ground-truth data.

4. The computing system of claim 1, wherein the instructions are executable to determine the geometric context for the scene by deriving the three-dimensional camera position relative to the fixed plane from the monocular image data.

5. The computing system of claim 1, wherein the instructions are executable to determine the one or more potential occluders based on a confidence level for a region of interest being greater than a threshold.

6. The computing system of claim 1, wherein the instructions are executable to project the occlusion zone by generating an occlusion cone in three dimensions based on the geometric context.

7. The computing system of claim 6, wherein the instructions are executable to generate the set of occluded regions of interest by projecting bounding boxes onto the fixed plane of the occlusion cone based on the geometric context.

8. The computing system of claim 1, wherein the instructions are executable to minimize the loss function by modeling object position and scale consistency during per region loss computations for each of foreground, background, and occluded regions of interest.

9. The computing system of claim 1, wherein minimizing location errors includes reprojecting each of foreground, background, and occluded regions of interest and ground-truth back onto the 3D space.

10. The computing system of claim 1, wherein the classifier comprises one or more proposal-based deep neural networks.

11. A computing system for performing object detection, comprising:
a logic machine; and
a storage machine holding instructions that, when executed, cause the logic machine to:
receive monocular image data for a scene;
determine a geometric context for the scene, the geometric context comprising a three-dimensional camera position relative to a fixed plane;
generate a set of regions of interest within the monocular image data;
identify a set of one or more potential occluders within the set of regions of interest;
for each potential occluder identified, project an occlusion zone onto the fixed plane in three-dimensions based on the geometric context;
draw a set of occluded regions of interest for each occlusion zone;
classify each region of interest and each occluded region of interest as a likelihood of being an object of interest; and
output a classification for each region of interest and each occluded region of interest.

12. The computing system of claim 11, wherein the fixed plane is a ground plane.

13. The computing system of claim 11, wherein the instructions are executable to determine the geometric context for the scene by deriving the three-dimensional camera position relative to the fixed plane from the monocular image data.

14. The computing system of claim 11, wherein the instructions are executable to determine the set of one or more potential occluders based on a confidence level for a region of interest being greater than a threshold.

15. The computing system of claim 11, wherein the instructions are executable to project an occlusion zone by generating an occlusion cone in three dimensions based on the geometric context.

16. The computing system of claim 15, wherein the instructions are executable to generate the set of occluded regions of interest by projecting regions of interest onto the fixed plane of the occlusion cone based on the geometric context.

17. The computing system of claim 11, wherein the instructions are executable to classify each region of interest and each occluded region of interest by applying classification criteria that are based in part on the geometric context.

18. A method for training a classifier to classify objects, the method comprising:
receiving monocular image data for a scene;
receiving ground-truth data for the scene;
determining a geometric context for the scene, the geometric context comprising a three-dimensional camera position relative to a ground plane;
determining a set of regions of interest within the monocular image data;
identifying a set of one or more potential occluders based on the set of regions of interest;
for each potential occluder identified, projecting an occlusion zone onto the ground plane in three-dimensions based on the geometric context;
generating a set of occluded regions of interest on the ground plane in three-dimensions for each occlusion zone;
projecting each occluded region of interest back to the image data in two-dimensions;
training the classifier by
minimizing a loss function generated by inputting information regarding the set of regions of interest and the set of occluded regions of interest into the classifier, and
minimizing location errors of each region of interest and each occluded region of interest of the set on the ground plane based on the ground-truth data; and
outputting the trained classifier for object detection.

19. The method of claim 18, wherein projecting an occlusion zone includes generating occlusion cone in three dimensions based on the geometric context.

20. The method of claim 18, wherein minimizing the loss function includes modeling object position and scale consistency during per region loss computations for each of foreground, background, and occluded regions of interest.

* * * * *